United States Patent [19]

Lach et al.

[11] 4,403,993

[45] Sep. 13, 1983

[54] PREPARATION OF WATER-SOLUBLE OR SELF-DISPERSING RESIN TANNING AGENTS

[75] Inventors: Dietrich Lach, Friedelsheim; Rolf Streicher, Worms; Gerhard Bolz, Frankenthal, all of Fed. Rep. of Germany

[73] Assignee: BASF Aktiengesellschaft, Rheinland-Pfalz, Fed. Rep. of Germany

[21] Appl. No.: 367,015

[22] Filed: Apr. 9, 1982

[30] Foreign Application Priority Data

Apr. 18, 1981 [DE]  Fed. Rep. of Germany ....... 3115646

[51] Int. Cl.$^3$ ................................................. C14C 3/18
[52] U.S. Cl. ..................................... 8/94.24; 8/94.21; 528/239; 528/242; 528/254; 528/256
[58] Field of Search ............... 528/239, 242, 254, 256; 8/94.21, 94.24

[56] References Cited

U.S. PATENT DOCUMENTS

| 3,023,073 | 2/1962 | Plapper et al. | 8/94.24 |
| 3,852,471 | 12/1974 | Paulus et al. | 424/334 |
| 4,001,157 | 1/1977 | Sander et al. | 524/512 |
| 4,132,522 | 1/1979 | Fono et al. | 8/496 |

FOREIGN PATENT DOCUMENTS 1670178  11/1970  Fed. Rep. of Germany .

*Primary Examiner*—Lucille M. Phynes
*Attorney, Agent, or Firm*—Oblon, Fisher, Spivak, McClelland & Maier

[57] ABSTRACT

Water-soluble or self-dispersing resin tanning agents are prepared by heating from 5 to 30% by weight of melamine, from 15 to 45% by weight of urea, from 20 to 35% by weight (calculated as anhydrous material) of formaldehyde and from 15 to 55% by weight of sodium bisulfite or of a corresponding amount of some other salt of sulfurous acid for from two to twelve hours in aqueous solution at 40°–120° C. and a pH of from 5 to 9.

10 Claims, No Drawings

PREPARATION OF WATER-SOLUBLE OR SELF-DISPERSING RESIN TANNING AGENTS

Commercial resin tanning agents conventionally consist of incompletely water-soluble condensates of aliphatic aldehydes with one or more compounds from the group comprising urea, dicyandiamide, melamine and guanidine. They are employed in retanning leathers which have preferably been chrome-tanned. They contain dispersants in order that the insoluble constituents may be so finely dispersed as to be substantially absorbed by the leather. The underlying concept is that the dispersed insoluble constituents in particular fill those parts of the tanned hide which have a loose structure and thereby improve the firmness of grain, and buffability. A particular disadvantage of some conventional commercial products is that during use they eliminate free formaldehyde, thereby creating a nuisance and health hazard to the user. It is a further disadvantage that these products in most cases contain relatively large amounts of non-dispersible insoluble constituents, so that they are only about 70-80% absorbed by the leather. A further disadvantage of these products which contain non-dispersible constituents is that the coarse particles detach from the interlaced fibers of the leather on dry milling and can cause soiling of the leather surface. Moreover, though the conventional products fill the loose-structured parts of the hide well, they generally cause these parts of the leather to harden, and the dispersions of certain products are unstable at a low pH. In addition, the commercial products give a leather having a more or less coarse grain. Finally, some of the commercial products only exhibit their optimum effect at about 60° C., ie. near a temperature range which is sufficiently high for it to cause some shrinkage of the leather.

The literature (for example U.S. Pat. No. 3,852,471 and German laid-open application No. 1,670,178) discloses the preparation of anionic resin tanning agents based on melamine. These products have not found industrial acceptance, primarily because the extremely short reaction times required to prepare the products are only achievable at great expense in industrial operation.

U.S. Pat. No. 3,023,073 teaches a combination of anionic and cationic resin tanning agents. The process is complex and has not found industrial acceptance.

It is an object of the present invention to provide a resin tanning agent which does not suffer from the above disadvantages.

We have found that this object is achieved by a process as defined in the present specification and claims.

In particular, we have found that condensation products of formaldehyde, urea, melamine and a water-soluble salt of sulfurous acid, for example sodium, potassium, ammonium or hydroxyethylammonium sulfite or bisulfite, preferably sodium bisulfite, also have the selective filling action on loose-structured parts of the leather which has been referred to above, though, due to their content of sulfonic acid groups, they are substantially more water-soluble and finely divided than the conventional resin tanning agents. Although these condensates are not genuinely water-soluble, they are self-dispersing and accordingly do not require the addition of a dispersant. On the other hand they can also readily be employed together with conventional commercial anionic dispersants.

Further advantages of the tanning agents obtained according to the invention are that they:

1. contain virtually no free formaldehyde,
2. bind virtually completely to the leather fibers and cannot be detached again even by dry milling,
3. have good lightfastness,
4. give a very fine-grained leather,
5. give an easily buffable leather,
6. give a leather which has excellent softness even in the loose-structured parts,
7. are compatible with the synthetic tanning agents, stuffing agents, dyes and acids conventionally employed in the retanning liquor, ie. do not precipitate and
8. can be employed at any temperature (about 20°-60° C.) conventionally used for retanning leather.

The process according to the invention gives particularly valuable products if a precondensate of formaldehyde, urea and melamine is first prepared and the resulting product is then reacted, in a second step, with bisulfite with or without additional formaldehyde. In the second step, one or more compounds from the group comprising urea, malamine, dicyandiamine and guanidine can also be added together with the formaldehyde.

The reaction temperature is 40°-120° C., but preferably 60°-100° C., so that substantially complete condensation is achieved without use of pressure. The pH used is 5-9, preferably 6-8, and results from the components themselves, without addition of alkali or acid. In every case 2-12 hours suffice for virtually complete condensation. Longer reaction times are not harmful, but are uneconomical.

The amount of melamine used is 5-30, preferably 5-20% by weight, based on the anhydrous total mixture, with amounts in the upper range leading to somewhat fuller but relatively coarse-grained leather.

The amount of urea used is 15-45, preferably 20-40,% by weight of the anhydrous mixture.

The amount of formaldehyde used is 20-35, preferably 25-30, % by weight (calculated as anhydrous material) of the mixture. If bisulfite is added only in the second condensation stage, the condensate must still contain free methylol groups or additional formaldehyde must be added with the bisulfite.

Lastly, the amount of sulfite used is 15-55, preferably 20-40, % by weight, calculated as sodium bisulfite.

Varying the relative amount of bisulfite provides a simple way of ensuring that the resin tanning agent has principally either a filling action or a grain-strengthening action. The optimum between both is achieved by using the preferred range stated above.

Because they contain solubilizing sulfonic acid groups, these resin tanning agents can be employed, by themselves, for retanning leather, which has preferably been chrome-tanned. If special effects in respect of softness, fineness of grain, strength of grain or pale intrinsic color of the leather are to be achieved, the resin tanning agents can be employed together with synthetic, vegetable and/or polymeric tanning agents.

The conventional retanning conditions may be used with the products obtained according to the invention, namely about 50-1,000% of water, based on shaved weight, 20°-60° C., pH 3.8-7, 1-20% total concentration, based on shaved weight, of the products employed for tanning and 30-240 minutes treatment time. The retanning can be effected in any conventional tanning apparatus, such as a tanning drum, a Y-compartmented tanning apparatus of the Hagspiel type or a winch vat.

In the examples, parts and percentages are by weight and in particular relate to shaved weight, unless stated otherwise.

EXAMPLE 1

92 parts of a 65% strength aqueous solution of a commercial condensate of 34 parts of urea, 30 parts of formaldehyde (calculated as anhydrous material) and 15 parts of melamine, having a flow time of 85 sec in a Ford cup with 4 mm nozzle at 20° C. (component 1) were stirred with 45 parts of water and 25 parts of sodium bisulfite for 4 hours at 90° C. The mixture was then cooled to room temperature. 100 parts of moist chrome sideleather of 1.5 mm split thickness were drummed for 60 minutes in a tanning drum with 10 parts of the aqueous solution obtained above, in 200 parts of water at pH 5.2 and 40° C. This was followed by fatliquoring with 4 parts of a commercial product, and adjustment of the pH to 3.5 with formic acid. The leather was dried, sawdusted and staked, and then assessed. It proved to be well-filled, firm-grained and soft, and had good light-fastness.

EXAMPLE 2

92 parts of component 1 in 50 parts of water were stirred with 52 parts of sodium bisulfite and 30 parts of urea for 2 hours at 90° C., 50 parts of 30% strength formaldehyde solution were then added dropwise and the mixture was diluted with 40 parts of water and stirred for 5 hours at 90° C. 100 parts of moist chrome sideleather of 1.5 mm split thickness were . . . introduced into 200 parts of water at pH 5.2 and 40° C. in a tanning drum, and were retanned with 10 parts of the above product and ·5 parts of a commercial tanning agent, based on phenolsulfonic acid, in powder form, and then fatliquored with 4 parts of a commercial product. The finished dry leather was well-filled, very firm-grained and soft.

EXAMPLE 3

95 parts of a 62% aqueous solution of a condensate of 28.8 parts of urea, 36 parts of formaldehyde and 14.5 parts of melamine were stirred with 50 parts of sodium bisulfite in 38 parts of water for 3 hours at 90° C. The product obtained was employed for retanning, using the method described in Example 2. The finished leather was well-filled, soft and firm-grained.

EXAMPLE 4

92 parts of component 1 in 50 parts of water were stirred with 57 parts of sodium bisulfite and 30 parts of urea for 2 hours at 60° C.; 50 parts of 30% strength formaldehyde solution were then added dropwise, followed by a further 65 parts of water. Finally, the mixture was stirred for 10 hours at 80° C. and the solution obtained was then spray-dried.

100 parts of moist chrome leather was retanned with 4 parts of the resin tanning agent powder obtained. A soft, well-filled, fine-grained leather was obtained.

We claim:

1. A process for preparing a water-soluble or self-dispersing tanning agent by heating from 5 to 30% by weight of melamine, from 15 to 45% by weight of urea, from 20 to 35% by weight (calculated as anhydrous material) of formaldehyde and from 15 to 55% by weight of sodium bisulfite or of a corresponding amount of some other salt of sulfurous acid for from two to twelve hours in aqueous solution at 40°-120° C. and a pH of from 5 to 9.

2. The process of claim 1 wherein the amount of melamine is in the range from about 5% to about 20% by weight.

3. The process of claim 1 wherein the amount of urea is in the range of from about 20% to about 40% by weight.

4. The process of claim 1 wherein the amount of formaldehyde is in the range of from about 25% to about 30% by weight.

5. The process of claim 1 wherein the amount of bisulfite is in the range of from about 20% to about 40% by weight.

6. The process of claim 1 wherein the reaction temperature is in the range of from about 60° to about 100° C.

7. The process of claim 1, wherein the pH range is from about 6 to about 8.

8. A process for retanning leather comprising: contacting leather with (a) about 50-1000% of water, based on the shaved weight of leather; and (b) about 1-20%, based on the shaved weight of leather, of a tanning agent produced by heating from 5 to 30% by weight of melamine, from 15 to 45% by weight of urea, from 20 to 35% by weight (calculated as anhydrous material) of formaldehyde and from 15 to 55% by weight of sodium bisulfite or a corresponding amount of some other salt of sulfurous acid for from 2 to 12 hours in aqueous solution at 40°-120° C. and a pH of from 5 to 9; at a temperature of 20°-60° C. and a pH of from 3.8 to 7.

9. The method according to claim 8, wherein the contacting is carried out for from 30 to 240 minutes.

10. The method according to claim 8, wherein the leather is chrome-tanned leather.

* * * * *